United States Patent
Markey, Jr. et al.

[19]

[11] Patent Number: 6,134,507
[45] Date of Patent: *Oct. 17, 2000

[54] METHOD AND APPARATUS FOR CALIBRATING A NON-CONTACT GAUGING SENSOR WITH RESPECT TO AN EXTERNAL COORDINATE SYSTEM

[75] Inventors: Myles Markey, Jr., Ann Arbor; Dale R. Greer, Novi; Brett Hibbard, Byron, all of Mich.

[73] Assignee: Perceptron, Inc., Plymouth, Mich.

[*] Notice: This patent issued on a continued prosecution application filed under 37 CFR 1.53(d), and is subject to the twenty year patent term provisions of 35 U.S.C. 154(a)(2).

[21] Appl. No.: 09/073,205

[22] Filed: May 4, 1998

Related U.S. Application Data

[63] Continuation-in-part of application No. 09/030,439, May 4, 1998, which is a continuation of application No. 08/597,281, Feb. 6, 1996, Pat. No. 5,748,505.

[51] Int. Cl.$^7$ .................................................. G01C 3/02
[52] U.S. Cl. ........................... 702/95; 702/94; 702/104; 356/139.03; 356/152.3
[58] Field of Search ............................. 702/95, 104, 93, 702/36, 40, 94, 97, 105, 113, 116, 150–153, 158, 159, FOR 163, FOR 159, FOR 160, FOR 156, FOR 157, FOR 145–FOR 148; 364/167.04–167.06, 167.08, 167.1, 167.12, 528.37, 38; 356/139.03, 139.04, 375, 152.2, 376, 383, 141.1, 152.3, 3.01–3.04, 3.06–3.11; 382/103, 106, 151, 312, 313, 317, 321; 33/545–547, 288, 502–506, 791; 73/1.75, 1.79; 901/9, 44–47; 250/231.11, 208.1, 203.1–203.3, 227.2, 559.1, 559.2, 559.29, 559.33, 339.09; 700/302, 303, 56–60, 62, 64, 66, 114, 109, 110, 192–195, 251, 254, 258, 259, 262

[56] References Cited

U.S. PATENT DOCUMENTS

| | | | |
|---|---|---|---|
| 4,645,348 | 2/1987 | Dewar et al. | 356/376 |
| 4,841,460 | 6/1989 | Dewar et al. | 702/95 |
| 4,964,722 | 10/1990 | Schumacher | 356/139.03 |
| 5,090,803 | 2/1992 | Ames et al. | 356/139.03 |
| 5,295,073 | 3/1994 | Celette | 702/152 |
| 5,329,469 | 7/1994 | Watanabe | 395/94 |
| 5,388,059 | 2/1995 | De Menthon | 702/153 |
| 5,532,816 | 7/1996 | Spann et al. | 356/152.3 |
| 5,552,883 | 9/1996 | Busch-Vishniac et al. | 356/139.03 |
| 5,661,667 | 8/1997 | Rueb et al. | 702/153 |

*Primary Examiner*—Hal Wachsman
*Attorney, Agent, or Firm*—Harness, Dickey & Pierce, P.L.C.

[57] ABSTRACT

The laser tracker is positioned at a vantage point to detect and calibrate its reference frame to the external reference frame demarcated by light-reflecting retro reflector. A tetrahedron framework with retro reflector mounted on one of the vertices serves as a reference target that is placed in front of the non-contact sensor to be calibrated. The laser tracker reads and calibrates the position of the retro reflector (and thus the tetrahedron) while the structured light of the non-contact sensor is projected onto the framework of the reference target. The structured light intersects with and reflects from the reference target, providing the non-contact sensor with positional and orientation data. These data are correlated to map the coordinate system of the non-contact sensor to the coordinate system of the external reference frame.

20 Claims, 4 Drawing Sheets

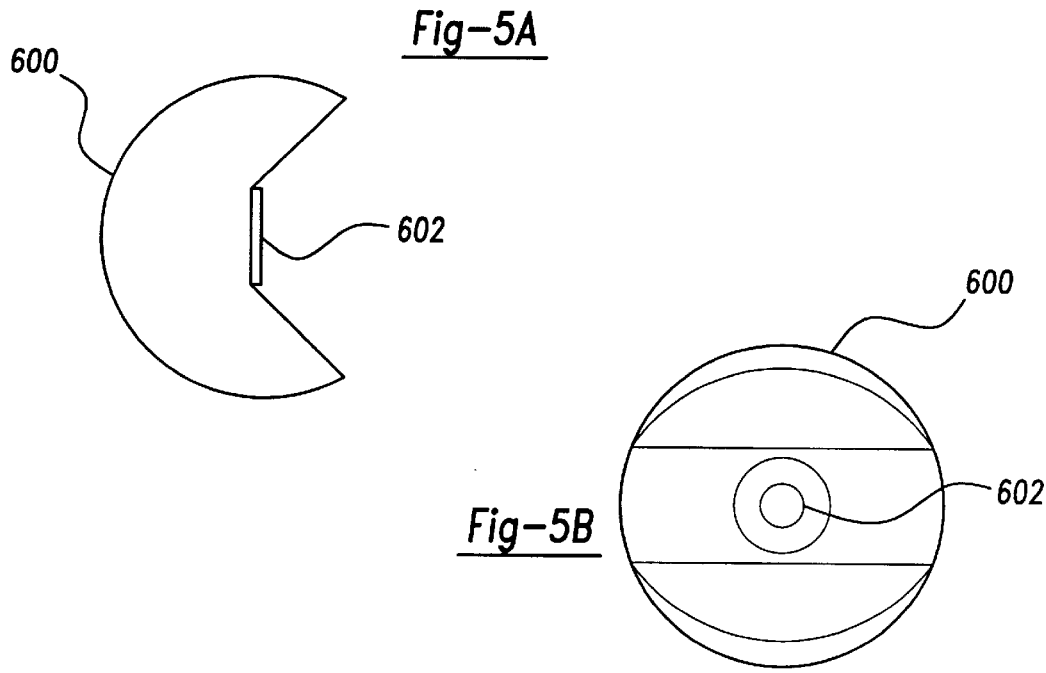
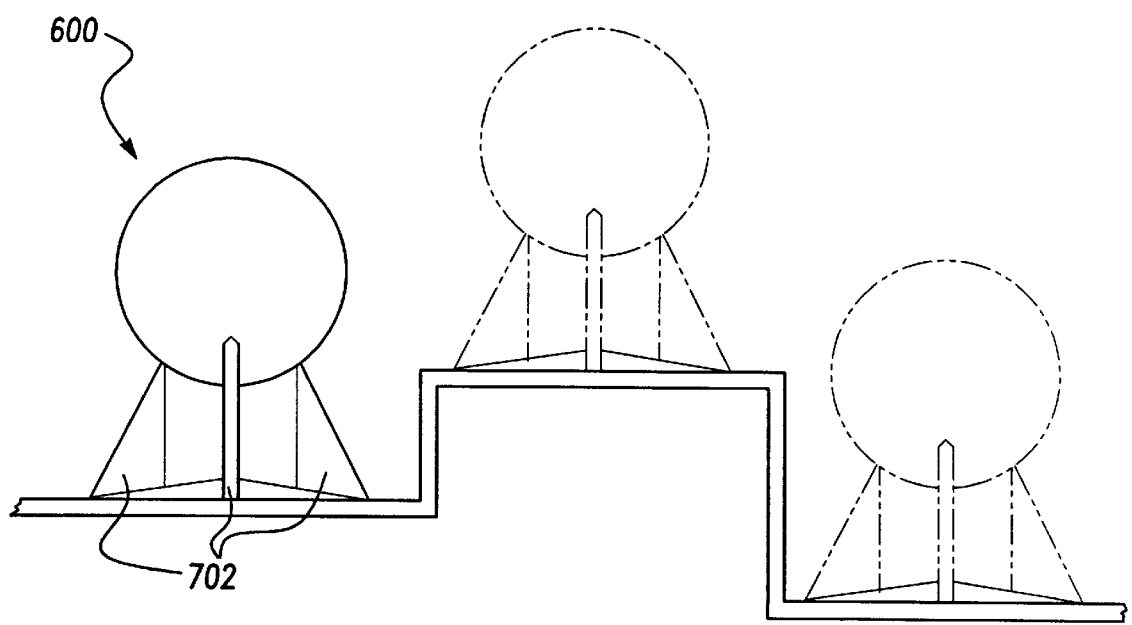

METHOD AND APPARATUS FOR CALIBRATING A NON-CONTACT GAUGING SENSOR WITH RESPECT TO AN EXTERNAL COORDINATE SYSTEM

CROSS-REFERENCE TO RELATED APPLICATION

This is a continuation-in-part of pending U.S. patent application Ser. No. 09/030,439 filed May 4, 1998 entitled "Method and Apparatus for Calibrating a Non-Contact Gauging Sensor with Respect to an External Coordinate System", which is a continuation of U.S. patent application Ser. No. 08/597,281, filed Feb. 6, 1996, now U.S. Pat. No. 5,748,505 issued May 5, 1998, each of which are assigned to the assignee of the present invention.

BACKGROUND AND SUMMARY OF THE INVENTION

The present invention relates generally to noncontact gauging systems. More particularly, the invention relates to an apparatus system and method for calibrating noncontact gauging systems.

Demand for higher quality has pressed manufacturers of mass produced articles, such as automotive vehicles, to employ automated manufacturing techniques that were unheard of when assembly line manufacturing was first conceived. Today, robotic equipment is used to assemble, weld, finish, gauge and test manufactured articles with a much higher degree of quality and precision than has been heretofore possible. Computer-aided manufacturing techniques allow designers to graphically conceptualize and design a new product on a computer workstation and the automated manufacturing process ensures that the design is faithfully carried out precisely according to specification. Machine vision is a key part of today's manufacturing environment. Machine vision systems are used with robotics and computer-aided design systems to ensure high quality is achieved at the lowest practical cost.

Achieving high quality manufactured parts requires highly accurate, tightly calibrated machine vision sensors. Not only must a sensor have a suitable resolution to discern a manufactured feature of interest, the sensor must be accurately calibrated to a known frame of reference so that the feature of interest may be related to other features on the workpiece. Without accurate calibration, even the most sensitive, high resolution sensor will fail to produce high quality results.

In a typical manufacturing environment, there may be a plurality of different noncontact sensors, such as optical sensors, positioned at various predetermined locations within the workpiece manufacturing, gauging or testing station. The workpiece is placed at a predetermined, fixed location within the station, allowing various predetermined features of the workpiece to be examined by the sensors. Preferably, all of the sensors properly positioned and should be carefully calibrated with respect to some common fixed frame of reference, such as a common reference frame on the workpiece or at the workstation.

Keeping sensors properly positioned and calibrated is more easily said than done. In a typical manufacturing environment sensors and their associated mounting structures may get bumped or jarred, throwing the sensor out of alignment. Also, from time to time, a sensor needs to be replaced, almost certainly requiring reorienting and recalibrating. Quite simply, sensor positioning, alignment and calibration is a fact of life in the typical manufacturing plant.

The problem with sensor positioning, alignment and calibration is the time required. Invariably, the entire manufacturing assembly line for a given part must be shut down and the workstation cleared, so that the sensor may be positioned, aligned and recalibrated. In some instances this entails placing a highly accurate (and very expensive) full-scale model of the workpiece in the workstation. This independently measured part is sometimes called a master part. The master part is placed in careful registration with the external coordinate system of the workstation and then each sensor is trained on its assigned feature (such as a hole or edge). Once positioned, the sensors are locked into place and calibrated and the master part is removed. Only then can the assembly line be brought back online.

As an alternative to using a master part, it is possible to calibrate the gauging sensor by attaching a target to the sensor and illuminating the target using a plane of structured light produced by the sensor. A pair of optical sighting devices, theodolites, are placed at different vantage points within the workspace. The theodolites triangulate on the illuminated target to provide an independent reading of the position of the target. The theodolites are placed at carefully prescribed locations relative to the external reference frame. With the gauging sensor projecting structured light onto the target, the theodolites are manually aimed at the lighted targets and readings are taken. The respective readings of the theodolites and the gauging sensor are coordinated and translated to calibrate the sensor relative to the external reference frame. It is a trial and error process. If the sensor needs to be reoriented (as is often the case), the theodolites must be manually retrained on the target after each sensor position adjustment. For more information on this calibration technique, see U.S. Pat. No. 4,841,460 to Dewar et al.

Whereas both of the aforementioned calibration techniques do work, there is considerable interest in a calibration technique that is quicker and easier to accomplish and that eliminates the need to rely on expensive master parts or difficult to use theodolite equipment. To this end, the present invention provides a calibration system that can be used in a matter of minutes, instead of hours, and without the need for precisely manufactured master parts or theodolite equipment. One of the major advantages of the invention is that it allows the calibration of a sensors to be checked or realigned between line shifts, without requiring the line to be shut down for an extended period.

The system employs a portable reference target that has a retroreflector mounted at a known location with respect to the center of the tetrahedron. The retroreflector is designed to reflect light from a companion laser tracker that is servo controlled to track the position of the retroreflector with its laser beam. The laser tracker is thereby able to acquire the position of the retroreflector (and thereby acquire the position of the attached portable reference target).

The presently preferred portable reference target is a tetrahedron framework that provides at least three noncolinear and noncoplanar geometric structures (e.g., straight edges) that are illuminated by structured light emanating from the feature sensor. These noncolinear geometric features provide the feature sensor with unambiguous spatial data for measuring the spatial position and attitude of the target.

The system uses coordinate transformations for coordinating the feature sensor coordinate frame to the external reference frame. The system includes a coordinate transformation system for coordinating the reading from the laser tracker and from the feature sensor. The laser tracker would be calibrated to the external reference frame using reference indicia and commercially available software. Using the tetrahedron with the structured light measurement, the transformation from sensor to tetrahedron space allows the identification of the center of the retroreflector in the sensor coordinates. As the laser tracker is only a device capable measuring X, Y and Z, but not orientation, multiple samples are needed to define the sensor orientation. Establishing three or more non-collinear points in a similar process allows the identification of the feature sensor coordinate frame with respect to reference coordinate frame of the laser tracker in all six degrees of freedom (X, Y, Z, roll, pitch and yaw).

Using the calibration system of the invention, it is easy to calibrate a feature sensor. The retroreflector is first illuminated by the laser tracker at several locations and used by the coordinate translation system to calibrate the laser tracker to the external reference frame. Next the target is placed within the field of view of the sensor under calibration. The portable reference target is calibrated with respect to the reference frame of the laser tracker. The sensor is then calibrated by projecting structured light from the feature sensor onto the portable reference target. The structured light intersects the target, producing reflected light patterns at the edges of the target that are then read by the feature sensor. The coordinate translation system then performs the appropriate coordinate translation to map the reading of the feature sensor back to the external reference frame.

The entire calibration sequence can be performed quite quickly. The laser tracker and portable reference targets are both lightweight and easily positioned. Moreover, the entire calibration sequence may be performed rapidly. In most instances, all the calibration technician must do is position the reference target at several locations while the laser tracker acquires and stores its position, and by then placing the portable reference target in front of the feature sensor and then allow the system to do the rest.

For a more complete understanding of the invention, its objects and advantages, reference may be had to the following specification and to the accompanying drawings.

BRIEF DESCRIPTION OF THE DRAWINGS

FIG. 5 is a detailed view of the retroreflector, showing the reflective surfaces; and FIG. 6 is a home nest calibration apparatus used to zero the retro reflector.

DESCRIPTION OF THE PREFERRED EMBODIMENT

Figure 1:
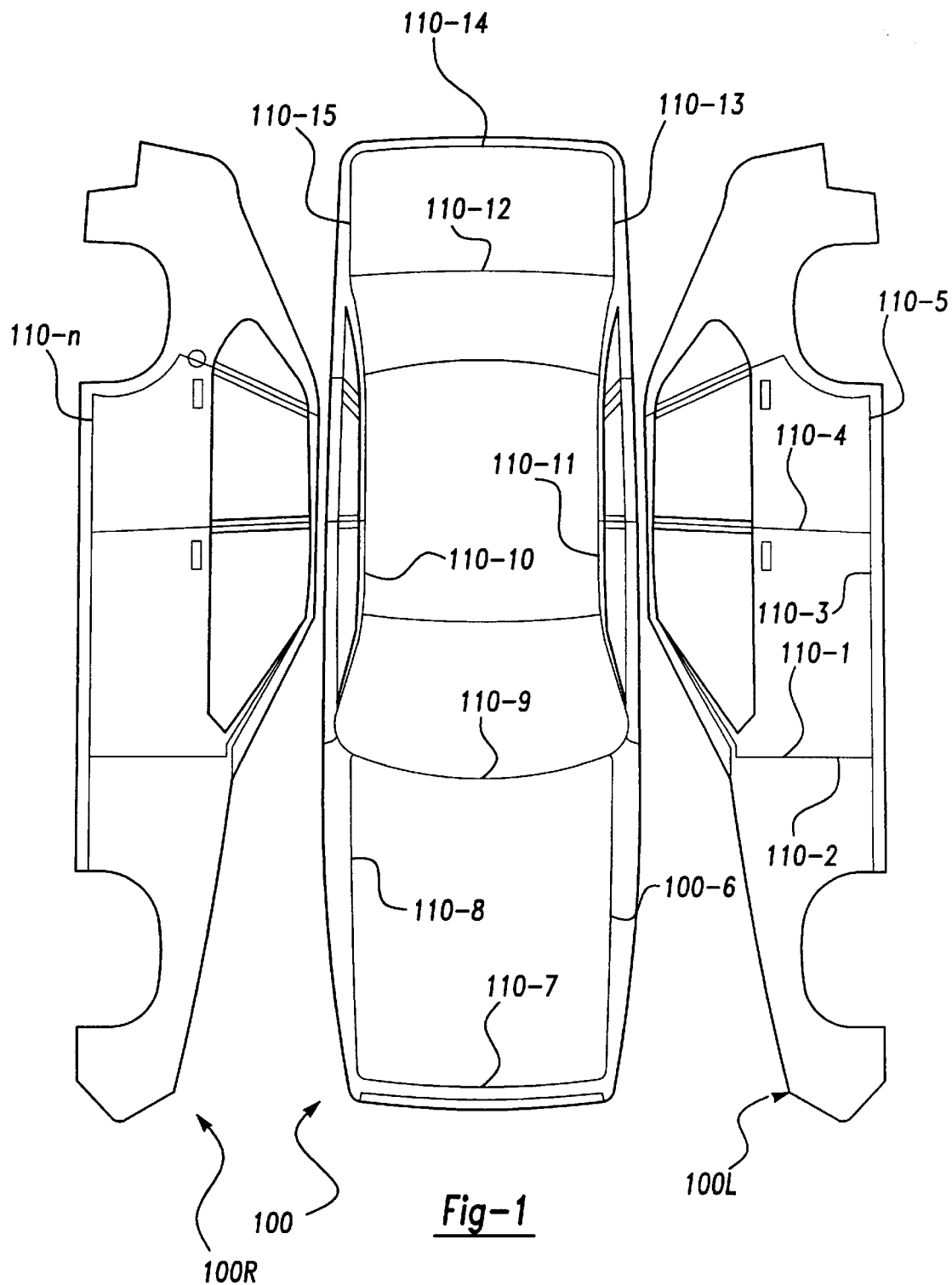
FIG. 1 is a simultaneous top and side view of a portion of an automotive vehicle body, showing typical points of interest which would be placed in the field of view of a plurality of noncontact feature sensors at a gauging station.

With reference to FIG. 1, there is shown a typical automotive vehicle body portion which, prior to its assembly with other of the vehicle components, would require gauging of certain key points. Such miscellaneous points of interest on workpiece 100 of FIG. 1 are shown as points 110-1 through 110-n. The left side 100L of the vehicle body and the right side 100R of the vehicle body are shown in an "unfolded" view for convenience in FIG. 1. Typical usages of the points or the manner in which they are selected would be dictated, for example, by the ensuing assembly process to take place with respect to the workpiece 100. For example, assume that the hood has not yet been assembled over the hood cavity at the front of the vehicle. Then measurements about the periphery of the hood cavity, such as at points 110-6, 110-7, 110-8 and 110-9 could be made to determine whether the ensuing assembly of the hood lid to the vehicle body can be performed with an acceptable fit between the parts to be assembled.

While there are many sensor arrangements known, including the optical arrangement disclosed in U.S. Pat. No. 4,645,348 to Dewar et al., assigned to the assignee of the present invention, it has been time consuming to calibrate the sensor readings at all the desired points of interest about a large workpiece with respect to any desired external reference frame. The present invention addresses the need for faster calibration.

Figure 2:
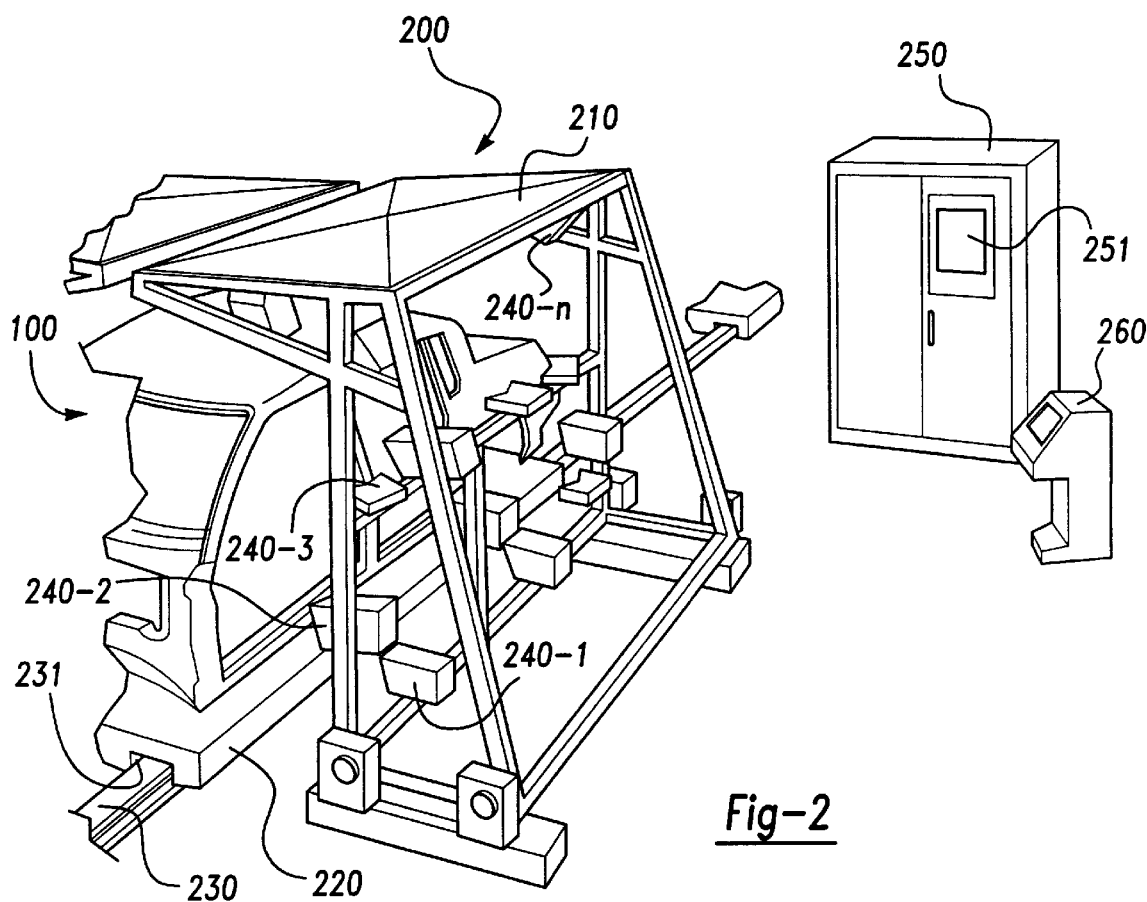
FIG. 2 is a perspective view of a typical gauging station on an automotive assembly line, including a plurality of noncontact feature sensors to be calibrated in accordance with the principles of the invention.

A typical gauging station for an automotive vehicle part as shown in FIG. 1 could take the form shown in FIG. 2. Workpieces to be gauged at gauging station 200 rest on transporting pallets 220, which are moved along an assembly line via pallet guides 230 that pass through guide channels 231 in the pallet. At the gauging station 200, a sensor mounting frame 210 (only one half of which is shown in perspective in FIG. 2) surrounds the workpiece 100 to be gauged and provides a plurality of mounting positions for a series of optical gauging sensors or feature sensors 240-1 through 240-n, each designed in accordance with the disclosure of U.S. Pat. No. 4,645,348, for example. Communication cables which are not specifically shown in FIG. 2 for clarity, couple the sensors 240 to a machine vision computer 250 which includes a CRT or cathode ray tube display 251. Optionally provided with a typical machine vision computer is a printer 260. The apparatus and method of this invention may be used to effect calibration of each of the sensors 240 with respect to a predetermined external coordinate system or reference frame, associated, for example, with the workpiece 100 to be measured or with respect to an external reference frame associated with the gauging station itself.

Figure 3:
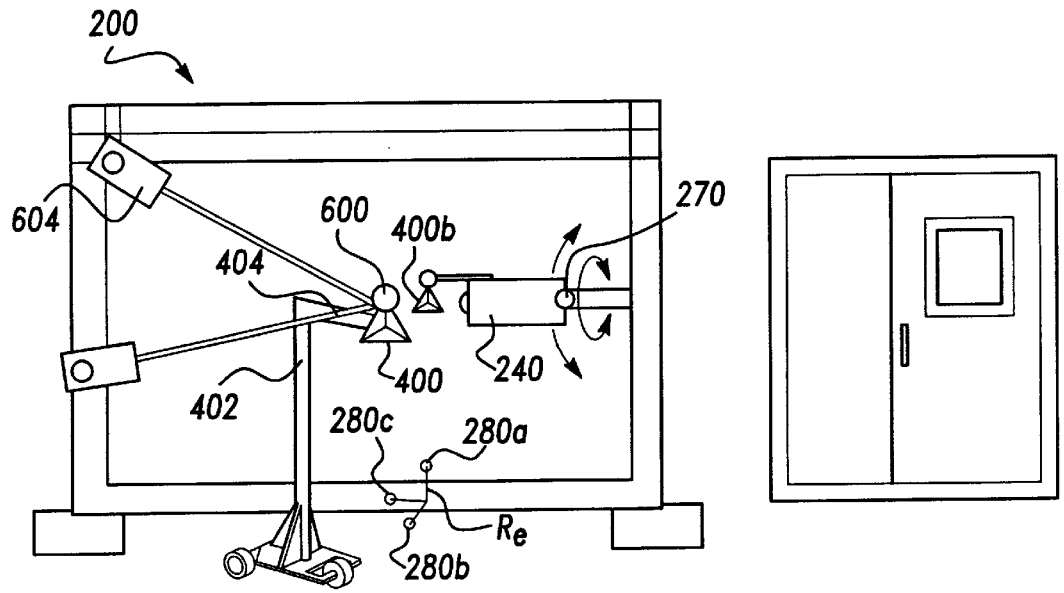
FIG. 3 is a side elevational view of the calibration system of the invention.

Referring to FIG. 3, gauging station 200 is shown in conjunction with the calibration system of the invention. To simplify the illustration, only one feature sensor 240 has been illustrated. The feature sensor 240 is adjustably secured to the gauging station frame as at 270, allowing the feature sensor to be positionally adjusted and then tightened or locked into place once it is properly aimed at the point in space (x, y, z) where the workpiece feature of interest will be located and is properly oriented at the correct attitude (pitch, yaw and roll).

The calibration system includes a servo driven laser tracker 604 that may be positioned at a convenient vantage point, such as above the space that is occupied by the workpiece in the gauging station. Alternatively, the laser tracker can be temporarily positioned in a fixed location, such as by hanging it from the gauging station frame or mounting it on a movable stand, allowing the laser tracker to be moved from location to location throughout the manufacturing facility.

The calibration system further includes a portable reference target 400. The presently preferred reference target is a lightweight, readily transportable tetrahedron framework. The reference target 400 can be mounted on any suitable fixture, allowing it to be positioned in front of the feature sensor 240 for the calibration operation. In FIG. 3, a first reference target 400 is shown attached to a simple tripod stand 402 with cantilevered arm 404. A second reference target 400b is attached by bracket directly to the feature sensor 240. These are just two examples, as other supporting structures may be used.

Figure 4:
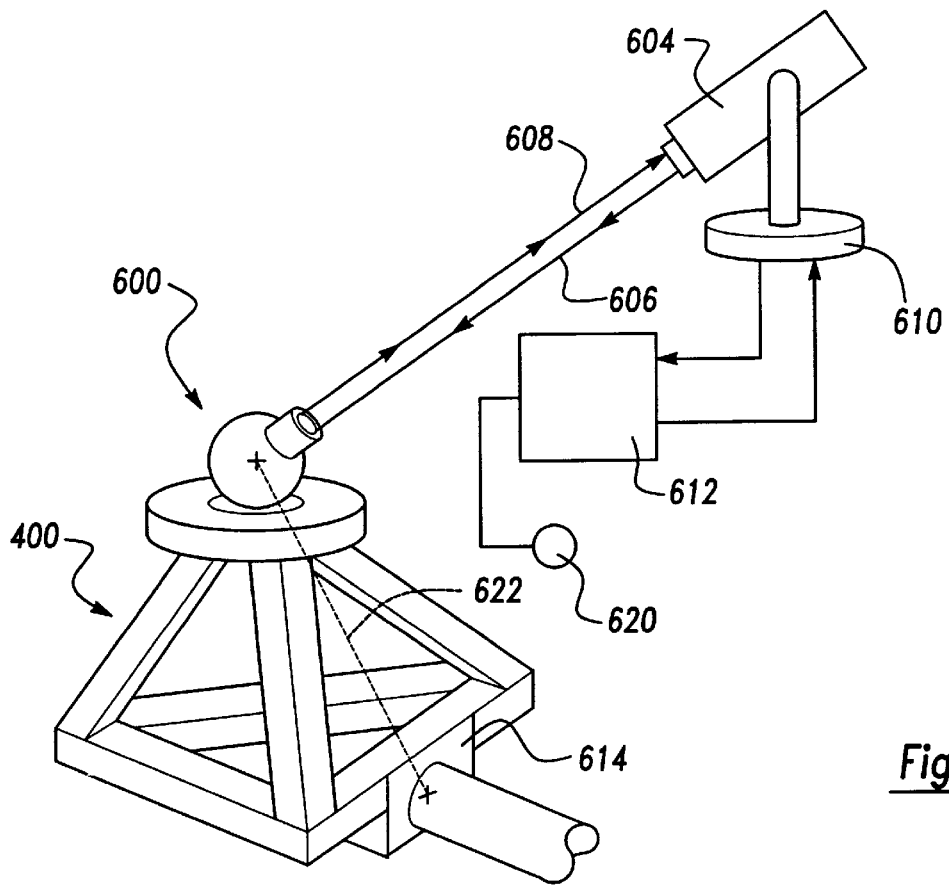
FIG. 4 is perspective view of an alternate embodiment of the invention employing laser tracker and retroreflector.

Referring to FIG. 4, the tetrahedron framework 400 is outfitted with a retroreflector 600, preferably by affixing to one of the vertices of the tetrahedron. The retroreflector, also shown in FIG. 5, includes an internal cornered mirror structure 602 that has the reflective property of reflecting an incoming light ray back to its source. The cornered mirror is formed by three intersecting mirrored planes that meet at right angles, like the corner formed by the intersecting walls and ceiling of a rectangular room. The retroreflector exhibits the retro-reflective property over a usable range of a corner cube is ±40°. Thus it will return an incoming beam of laser light originating from a position essentially anywhere within a 40° semisphere centered on a line that bisects the retro reflective corner. The illustrated reflector is a corner reflector that has a ±40° range. It is envisioned that a larger usable range may be achieved with other types of reflectors; for example, a "cat's eye" reflector will provide a ±60° usable range.

Referring to FIG. 4, the system includes a servo driven laser tracker 604 that emits an outgoing laser beam 606 and detects an incoming laser beam 608. The laser tracker includes a servo drive mechanism 610 with closed loop controller 612 that points the laser tracker in the direction of the incoming beam 608. As long as the laser tracker is within the 45–60° field of view of the retroreflector, the laser tracker will precisely follow or track the position of the retroreflector.

The interferometer within the laser tracker allows the system to achieve very high accuracy. The current embodiment will track the position of the retroreflector within ±50 microns (~0.002"). Thus the retroreflector and the laser tracker system can precisely track where the center of the retroreflector is at all times, even as the retroreflector is moved around.

The retroreflector is preferably mounted on a vertex of the tetrahedron framework, and the framework is provided with a mounting fixture 614 for attachment to a tripod stand, anchoring point or directly to the feature sensor's structure, or to some other suitable structure, such as a tripod stand 402 (FIG. 3). By securing the retroreflector to the tetrahedron and by then calibrating the reflector relative to the fixture 614, the center of the retroreflector (the corner point at which the mirrored surfaces mutually intersect) may be geometrically calibrated in terms of an offset relative to the location and orientation of the mounting fixture 614. This calibration may be done by moving the assembly to three or four different locations within a previously calibrated structured light sensor measuring zone. Ideally, this calibration should be done using a sufficient number of measurements to ensure that the X, Y, Z offset between the center of the retroreflector and the mounting fixture 614 is known. This offset is shown by dotted lines 622 in FIG. 4.

In use, the laser tracker embodiment can be used to link the external reference frame (typically that of the user) with the reference frame of the structured light feature sensor, using the tetrahedron framework and retroreflector as the intermediary link. First, the laser tracker is calibrated to the external reference frame using reference indicia and commercially available software. External reference frame $R_e$ has been diagrammatically included in FIG. 3 as a plurality of noncolinear reference indicia 280a, 280b and 280c. Next, the tetrahedron framework is intersected by a plane of structured light (from the feature sensor), thereby establishing a relationship between the tetrahedron and the feature sensor. The laser tracker, by tracking the center position of the retroreflector, establishes a relationship between the laser tracker and the tetrahedron framework. The servo system and closed loop controller of the laser tracker provides a signal indicative of the line of sight through the center of the retroreflector, and suitable interferometer measurements can be used to accurately ascertain the distance between the laser tracker and the retroreflector center. These data are output at 620 of FIG. 4.

The laser tracker provides a partial link to the external reference frame or user reference frame. It will generate the X, Y, Z position of the retroreflector as provided on output 620. In order to acquire all six degrees-of-freedom (X, Y, Z as well as roll, pitch, yaw) the target may be moved to three or more locations while acquiring data. Preferably, four or more non-collinear location points are used. Once this has been done the data may be used to triangulate onto a six degree-of-freedom location and orientation.

The laser tracker can be conveniently calibrated (to zero the retroreflector) using a "home nest" calibration fixture. Shown in FIG. 6, the home nest employs a plurality of nest cites (three are shown in FIG. 6) each having a three point spherical support structure that will hold the retroreflector. Preferably, the three supports 702 are magnetized to tightly hold the retroreflector. Each of the nest cites has a precise location relative to the external coordinate system.

The retroreflector is moved manually from nest cite to nest cite, all the while being careful to ensure that the laser beam is able to track its movement. The location data on output 620 (FIG. 4) are noted as the retroreflectors are held in each nest. The laser tracker requires calibration before the above-described process for calibrating the feature sensor can be performed.

While the invention has been described in its presently preferred form, it will be understood that the invention is capable of modification without departing from the spirit of the invention as set forth in the appended claims.

What is claimed is:

1. A sensor calibration system for calibrating a non-contact sensor having a sensing zone associated with a non-contact sensor reference frame, with respect to an external reference frame, comprising:

a reference indicia disposed in fixed relation to said external reference frame;

a laser tracker having a calibration field of observation associated with a laser tracker reference frame, said laser tracker being positionable at a vantage point such that said reference indicia is within the calibration field of observation;

a target framework for placement coincidentally within the calibration field of observation of said laser tracker and within the sensing zone of said non-contact sensor;

a coordinate transformation system coupled to said laser tracker for collecting data from said laser tracker regarding the position of said reference indicia within said laser tracker reference frame for establishing a first translational relationship between the laser tracker reference frame and the external reference frame;

said coordinate transformation system further being adapted for collecting data from the laser tracker and the non-contact sensor regarding the position of said target framework within the laser tracker reference frame and the non-contact sensor reference frame, respectively, when said target framework is in at least three noncolinear positions, for establishing a second translational relationship between the laser tracker reference frame and the non-contact sensor reference frame; and said coordinate transformation system utilizing said first and second translational relationships for determining a third translational relationship between the external reference frame and the non-contact sensor reference frame, said third translational relationship enabling said coordinate transformation system to convert measurement data from said non-contact sensor to said external reference frame and thereby calibrate the non-contact sensor with respect to the external reference frame.

2. The sensor calibration system of claim 1 wherein said target framework comprises a retroreflector affixed to a tetrahedron.

3. The sensor calibration system of claim 2 wherein said laser tracker tracks a center position of said retroreflector in at least three noncolinear location points to establish said second translational relationship between the laser tracker reference frame and the non-contact sensor reference frame.

4. The sensor calibration system of claim 1 wherein said non-contact sensor is an optical sensor.

5. The sensor calibration system of claim 1 wherein said non-contact sensor is an active optical sensor that emits structured light and detects reflected light.

6. The sensor calibration system of claim 1 further comprising a gauging station for gauging a workpiece, said non-contact sensor being securely connected to said gauging station for determining measurement information for said workpiece.

7. A sensor calibration system for calibrating a non-contact sensor having a sensing zone associated with a non-contact sensor reference frame, with respect to an external reference frame, comprising:

a reference indicia disposed in fixed relation to said external reference frame;

a laser tracker having a calibration field of observation associated with a laser tracker reference frame, said laser tracker being positionable at a vantage point such that said reference indicia is within the calibration field of observation;

a reference target for placement coincidentally within the calibration field of observation of said laser tracker and within the sensing zone of said non-contact sensor;

a coordinate transformation system coupled to said laser tracker for collecting data from said laser tracker regarding the position of said reference indicia within the laser tracker reference frame for establishing a first translational relationship between the laser tracker reference frame and the external reference frame;

said coordinate transformation system further being coupled to said laser tracker and to said non-contact sensor for collecting data from said laser tracker regarding the position of said reference target within the laser tracker reference frame and from said non-contact sensor regarding the position of said reference target within the non-contact sensor reference frame, for establishing a second translational relationship between the laser tracker reference frame and the non-contact sensor reference frame; and said coordinate transformation system utilizing said first and second translational relationships for determining a third translational relationship between the external reference frame and the non-contact sensor reference frame, said third translational relationship enabling said coordinate transformation system to convert measurement data from said non-contact sensor to said external reference frame and thereby calibrate the non-contact sensor with respect to the external reference frame.

8. The sensor calibration system of claim 7 wherein said reference target comprises retroreflector affixed to a target framework.

9. The sensor calibration system of claim 8 wherein said laser tracker tracks a center position of said retroreflector in at least three noncolinear location points establishing said second translational relationship between the laser tracker reference frame and the non-contact sensor reference frame.

10. The sensor calibration system of claim 8 wherein said target framework comprises a tetrahedron.

11. The sensor calibration system of claim 8 wherein said non-contact sensor is an optical sensor.

12. The sensor calibration system of claim 8 wherein said non-contact sensor is an active optical sensor that emits structured light and detects reflected light.

13. The sensor calibration system of claim 8 further comprising a gauging station for gauging a workpiece, said non-contact sensor being securely connected to said gauging station for determining measurement information for said workpiece.

14. A method for calibrating a non-contact sensor having associated therewith a non-contact sensor reference frame, with respect to an external reference frame using a laser tracker, the laser tracker having a fixed position with respect to the external reference frame according to a first relationship, comprising the steps of:

providing a reference target for placement coincidentally within a calibration field of observation of said laser tracker and within a sensing zone of said non-contact sensor;

determining a second relationship between said reference target and the external reference frame through use of said laser tracker and said reference target, said second relationship defining the position of said reference target with respect to the external reference frame;

determining a third relationship between said reference target and said non-contact sensor through use of said non-contact sensor and said reference target, said third relationship defining the position of said reference target with respect to the non-contact sensor reference frame; and using said first, second and third relationships to convert measurement data from said non-contact sensor to said external reference frame thereby calibrating said non-contact sensor with respect to the external reference frame.

15. The method of claim 14 wherein said second relationship defines the location and the orientation of the reference target with respect to the external reference frame.

16. The method of claim 15 wherein six degrees of freedom are used for defining said location and orientation of the reference target.

17. The method of claim 14 wherein said third relationship defines the location and the orientation of the reference target with respect to the location and orientation of the non-contact sensor.

18. The method of claim 17 wherein six degrees of freedom are used for defining the locations and the orientations of said reference target and of said non-contact sensor.

19. The method of claim 14 wherein the step of determining the second relationship further comprises:
   placing said reference target within the calibration field of observation of said laser tracker; and
   determining the position of said reference target with respect to the external reference frame using said laser tracker.

20. The method of claim 14 wherein the step of determining the third relationship further comprises:
   placing said reference target within the sensing zone of said non-contact sensor;
   projecting structured light from said non-contact sensor upon said reference target; and
   determining the position of said reference target with respect to said non-contact sensor based upon the structured light reflected to said non-contact sensor from said reference target.

* * * * *